United States Patent
Schoeck et al.

(10) Patent No.: US 11,169,573 B2
(45) Date of Patent: Nov. 9, 2021

(54) DISPLAY POSITIONING ASSEMBLY

(71) Applicant: Microsoft Technology Licensing, LLC, Redmond, WA (US)

(72) Inventors: Kaitlyn Marley Schoeck, Seattle, WA (US); Christina Ashley Yee, Redmond, WA (US); Robyn Rebecca Reed McLaughlin, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 27 days.

(21) Appl. No.: 16/725,462

(22) Filed: Dec. 23, 2019

(65) Prior Publication Data

US 2021/0191470 A1 Jun. 24, 2021

(51) Int. Cl.
*G06F 1/16* (2006.01)

(52) U.S. Cl.
CPC ............ *G06F 1/1656* (2013.01); *G06F 1/166* (2013.01); *G06F 1/169* (2013.01); *G06F 1/1616* (2013.01); *G06F 1/1637* (2013.01)

(58) Field of Classification Search
CPC ....... G06F 1/1656; G06F 1/166; G06F 1/1679
See application file for complete search history.

(56) References Cited

U.S. PATENT DOCUMENTS

| | | | | |
|---|---|---|---|---|
| 6,366,440 B1 * | 4/2002 | Kung | .................. | E05C 19/16 361/147 |
| 7,184,263 B1 * | 2/2007 | Maskatia | .............. | G06F 1/1616 248/917 |
| 7,426,115 B2 * | 9/2008 | Shih | ..................... | H04M 1/0237 361/756 |
| 7,595,980 B2 * | 9/2009 | Wang | .................. | H04M 1/0222 16/367 |
| 8,254,093 B2 * | 8/2012 | Wu | ........................ | G06F 1/1624 361/679.01 |
| 8,705,229 B2 * | 4/2014 | Ashcraft | ............... | G06F 1/1679 361/679.27 |
| 9,025,321 B2 * | 5/2015 | Liang | .................... | G06F 1/1626 361/679.09 |

(Continued)

FOREIGN PATENT DOCUMENTS

| | | |
|---|---|---|
| CN | 201583860 U | 9/2010 |
| CN | 203178865 U | 9/2013 |

(Continued)

OTHER PUBLICATIONS

Rodriguez, Rick, "Samsung Galaxy Book is the choice for drawing on the go", Retrieved from: https://www.surfaceproartist.com/blog/2017/8/9/samsung-galaxy-book-is-the-choice-for-drawing-on-the-go, Aug. 9, 2017, 17 Pages.

(Continued)

*Primary Examiner* — Adrian S Wilson
(74) *Attorney, Agent, or Firm* — Alleman Hall Creasman & Tuttle LLP

(57) ABSTRACT

A display positioning assembly comprises a base portion and a display portion. The base portion comprises a base ferromagnetic component moveably retained within the base portion. The display portion comprises a display ferromagnetic component. The display portion is moveably coupled to the base portion. One or both of the base ferromagnetic component and display ferromagnetic component is a magnet.

20 Claims, 9 Drawing Sheets

(56) References Cited

U.S. PATENT DOCUMENTS

| | | |
|---|---|---|
| 9,128,676 B2 | 9/2015 | Chang et al. |
| 9,261,910 B2* | 2/2016 | Liang .................... G06F 1/1632 |
| 9,268,365 B2* | 2/2016 | Chang .................... G06F 1/1633 |
| 9,277,661 B2* | 3/2016 | Andre ..................... E05C 19/16 |
| 9,436,229 B2* | 9/2016 | Yoo ........................ G06F 1/1667 |
| 9,685,732 B2* | 6/2017 | Eromaki .............. H05K 7/1401 |
| 10,013,029 B2 | 7/2018 | Senatori et al. |
| 10,303,209 B2 | 5/2019 | Smith et al. |
| 10,671,126 B2* | 6/2020 | Wang .................... G06F 1/1652 |
| 2004/0159762 A1* | 8/2004 | Ghosh ....................... G06F 1/16 248/351 |
| 2007/0133156 A1* | 6/2007 | Ligtenberg ............ G06F 1/1679 361/679.27 |
| 2007/0217135 A1* | 9/2007 | Chuang ................. G06F 1/1681 361/679.05 |
| 2009/0103261 A1* | 4/2009 | Shih ...................... G06F 1/1616 361/679.58 |
| 2010/0238620 A1* | 9/2010 | Fish ...................... G06F 1/1681 361/679.09 |
| 2012/0194977 A1 | 8/2012 | Liu et al. |
| 2014/0063717 A1* | 3/2014 | Tseng .................... G06F 1/1624 361/679.21 |
| 2014/0139989 A1 | 5/2014 | Mori et al. |
| 2015/0237748 A1 | 8/2015 | Andre et al. |
| 2015/0346775 A1 | 12/2015 | Tseng et al. |

FOREIGN PATENT DOCUMENTS

| | | |
|---|---|---|
| CN | 203366193 U | 12/2013 |
| CN | 104597969 A | 5/2015 |

OTHER PUBLICATIONS

"International Search Report and Written Opinion Issued in PCT Application No. PCT/US2020/059253", dated Feb. 11, 2021, 11 Pages.

* cited by examiner

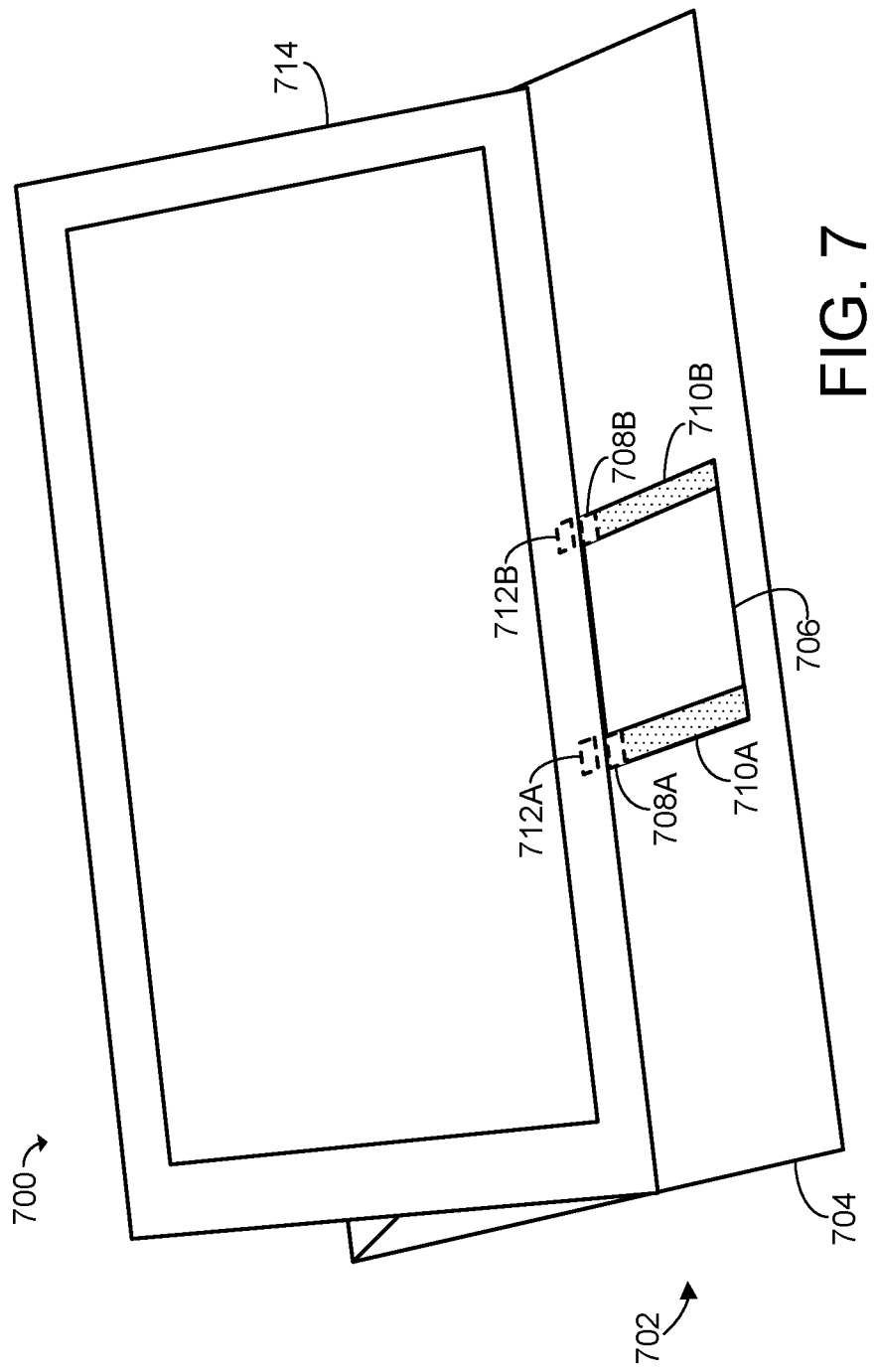

800

POSITION A BOTTOM EDGE OF THE DISPLAY PORTION AT A SECURABLE DISPLAY POSITION ON AN UPPER SURFACE OF A BASE PORTION OF THE COMPUTING DEVICE, THE DISPLAY PORTION COMPRISING A DISPLAY FERROMAGNETIC COMPONENT, THE BASE PORTION COMPRISING A BASE FERROMAGNETIC COMPONENT, AND ONE OR BOTH OF THE DISPLAY FERROMAGNETIC COMPONENT AND BASE FERROMAGNETIC COMPONENT IS A MAGNET, SUCH THAT THE BOTTOM EDGE OF THE DISPLAY PORTION IS SECURED AT THE SECURABLE DISPLAY POSITION VIA MAGNETIC ATTRACTION BETWEEN THE BASE FERROMAGNETIC COMPONENT AND THE DISPLAY FERROMAGNETIC COMPONENT
802

SLIDE THE BOTTOM EDGE OF THE DISPLAY PORTION ALONG THE UPPER SURFACE OF THE BASE PORTION FROM THE FIRST SECURABLE DISPLAY POSITION TO A SECOND SECURABLE DISPLAY POSITION, WHEREIN MOVEMENT OF THE DISPLAY PORTION TO THE SECOND SECURABLE DISPLAY POSITION CASUES CORRESPONDING MOVEMENT OF THE BASE FERROMAGNETIC COMPONENT VIA MAGNETIC ATTRACTION BETWEEN THE BASE FERROMAGNETIC COMPONENT AND THE DISPLAY FERROMAGNETIC COMPONENT
804

FIG. 8

DISPLAY POSITIONING ASSEMBLY

BACKGROUND

Many electronic devices, such as laptop computers, have foldable "clamshell" form factors. These devices are characterized by two different portions (e.g., a display portion and a base portion) that are rotatably coupled via a hinge.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

A display positioning assembly comprises a base portion and a display portion. The base portion comprises a base ferromagnetic component moveably retained within the base portion. The display portion comprises a display ferromagnetic component. The display portion is moveably coupled to the base portion. One or both of the base ferromagnetic component and display ferromagnetic component is a magnet.

BRIEF DESCRIPTION OF THE DRAWINGS

FIG. 7 schematically depicts another example of a display positioning assembly according to examples of the present disclosure.

FIG. 8 illustrates an example method for positioning a display portion of a computing device according to examples of the present disclosure.

DETAILED DESCRIPTION

In designing electronic devices with one or more rotatable or foldable portions (e.g., clamshell-type devices as discussed above), it is often desirable to increase the range of angles or orientations that one portion can assume relative to another. To this end, the present disclosure describes a display positioning assembly comprising a base portion and a display portion that is moveably coupled to the base portion. As will be described in more detail below, a bottom edge of the display portion is not rigidly affixed to any particular position on the base portion, unlike in conventional computing devices such as laptop computers. Rather, in some examples described herein the display portion includes a living hinge that is rotatably coupled to a base portion via a collapsible support member, thereby enabling the display to pivot about the living hinge, and the living hinge to pivot about the base portion.

Further, the display positioning assembly of the present disclosure enables the bottom edge of the display portion to be easily and conveniently secured to any position of a continuous range of securable display positions on the base portion—e.g., allowing the display to be smoothly positioned in a wider variety of orientations than would ordinarily be possible. In particular and as described in more detail below, one or more moveable ferromagnetic components in the base portion cooperate with corresponding ferromagnetic component(s) in the display portion to allow smooth and convenient positioning and repositioning of the display relative to the base portion. One or both of the base ferromagnetic component(s) and display ferromagnetic component(s) may be magnets. In different examples, the display positioning assembly of the present disclosure may be implemented in a computing device (e.g., a laptop computer), or any other suitable electronic device of any form factor having a display portion that is moveably coupled to a base portion.

Figure 1A:
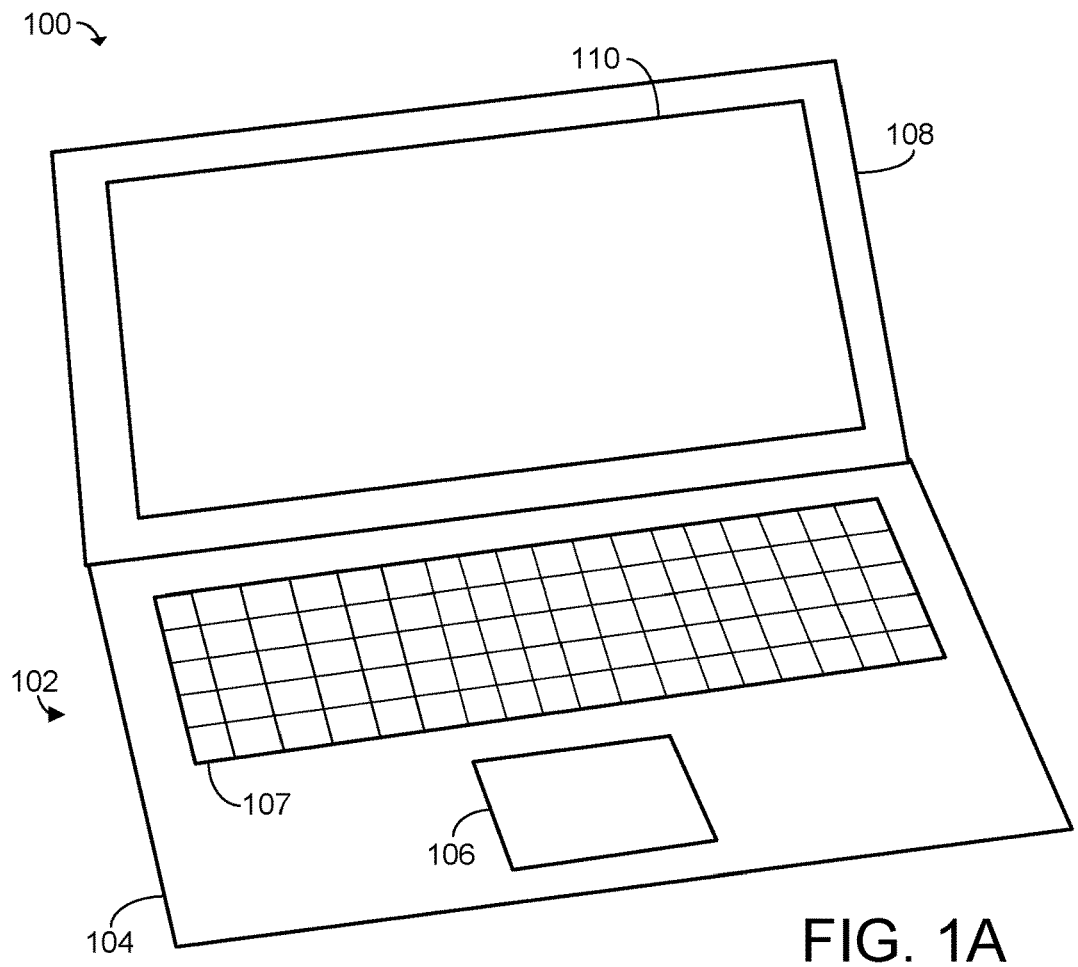
FIGS. 1A and 1B schematically depict an example computing device utilizing a display positioning assembly according to examples of the present disclosure.

FIG. 1A schematically depicts an example computing device 100 (e.g., laptop computer) that includes a display positioning assembly 102 according to aspects of the present disclosure. In this example, display positioning assembly 102 comprises a base portion 104 that includes a trackpad 106 and a keyboard 107. Display positioning assembly 102 also comprises a display portion 108 that includes a display screen 110.

It will be understood that computing device 100 and display positioning assembly 102 as described herein are presented as nonlimiting examples for illustrative purposes and are schematic in nature. Other display positioning assemblies and computing devices contemplated by this disclosure may have alternate shapes, sizes, dimensions, and form factors. For example, computing devices in which display positioning assemblies of the present disclosure may be utilized may include any suitable collection of input/output devices and other hardware components. For example, while computing device 100 includes trackpad 106 and keyboard 107, other computing devices utilizing a display positioning assembly of the present disclosure may omit either or both of these input devices, and/or include one or more input devices not discussed herein.

In the present example, the display portion 108 of computing device 100 includes a display screen 110, which may have any suitable size, resolution, and utilize any suitable display technology. As examples, the display screen may be a liquid crystal display (LCD), light emitting diode (LED) display, plasma display, quantum dot display (QLED), e-ink/e-paper display, or other suitable display type. Additional details regarding the components and computing aspects of computing device 100 are described in more detail below with reference to the example computing system of FIG. 9.

Components of computing device 100 may be composed or constructed from any suitable materials. As examples, a chassis of computing device 100 may be constructed from one or more suitable plastics, metal alloys (e.g., aluminum, magnesium), ceramics, etc. Suitable paints, coatings, or finishes may optionally be applied. For example and as described below, one or more parts or components of the computing device 100 may comprise or be covered in a natural or synthetic fabric, a copolymer (e.g., nylon), an elastomeric layer (e.g., rubber), etc.

Figure 1B:
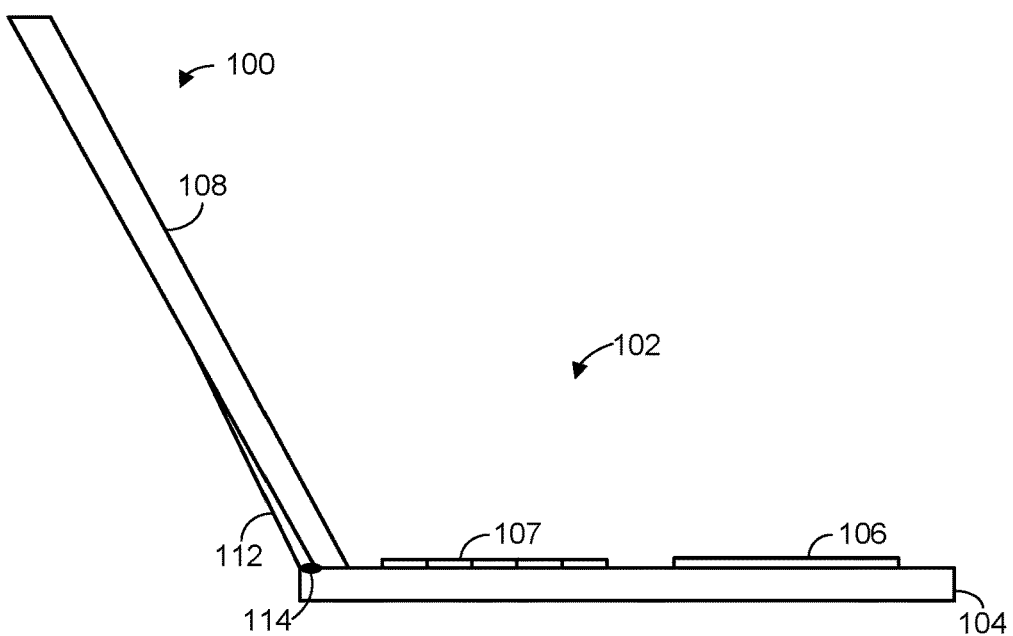

FIG. 1B schematically depicts a side view of computing device 100. Notably and with reference also to FIGS. 3A and 3B, base portion 104 and display portion 108 are moveably coupled via a collapsible support member 112, such that display portion 108 may be held at any of a range of display angles relative to base portion 104. In the illustrated example, the display portion 108 is held at approximately a 120° angle relative to the base portion 104, although other display angles are possible. For example, when the bottom of the display portion 108 is located at the illustrated position at the back of base portion 104, the display portion may be pivoted between a 0° angle (i.e., folded flat over the base portion) and a maximum display angle, which may have any suitable value depending on the implementation (e.g., 120°, 180°).

Figure 3A:
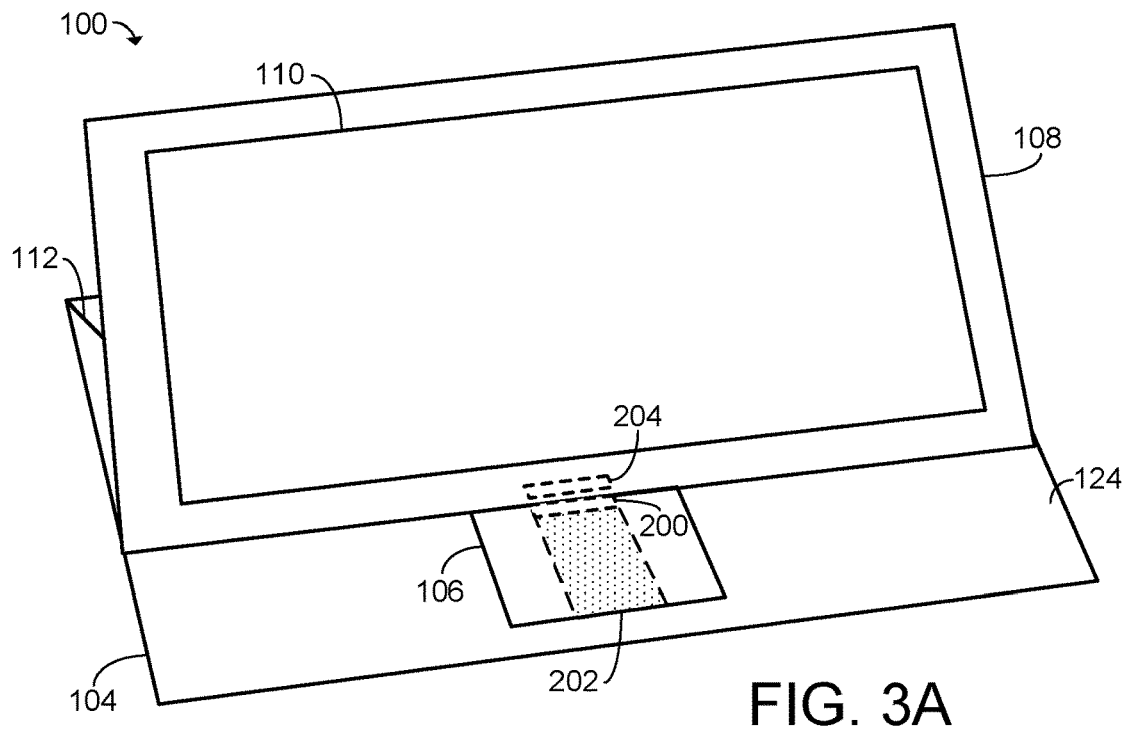
FIGS. 3A and 3B schematically depict the example computing device of FIGS. 1A and 1B in which the display is positioned behind the trackpad according to examples of the present disclosure.
Figure 3B:
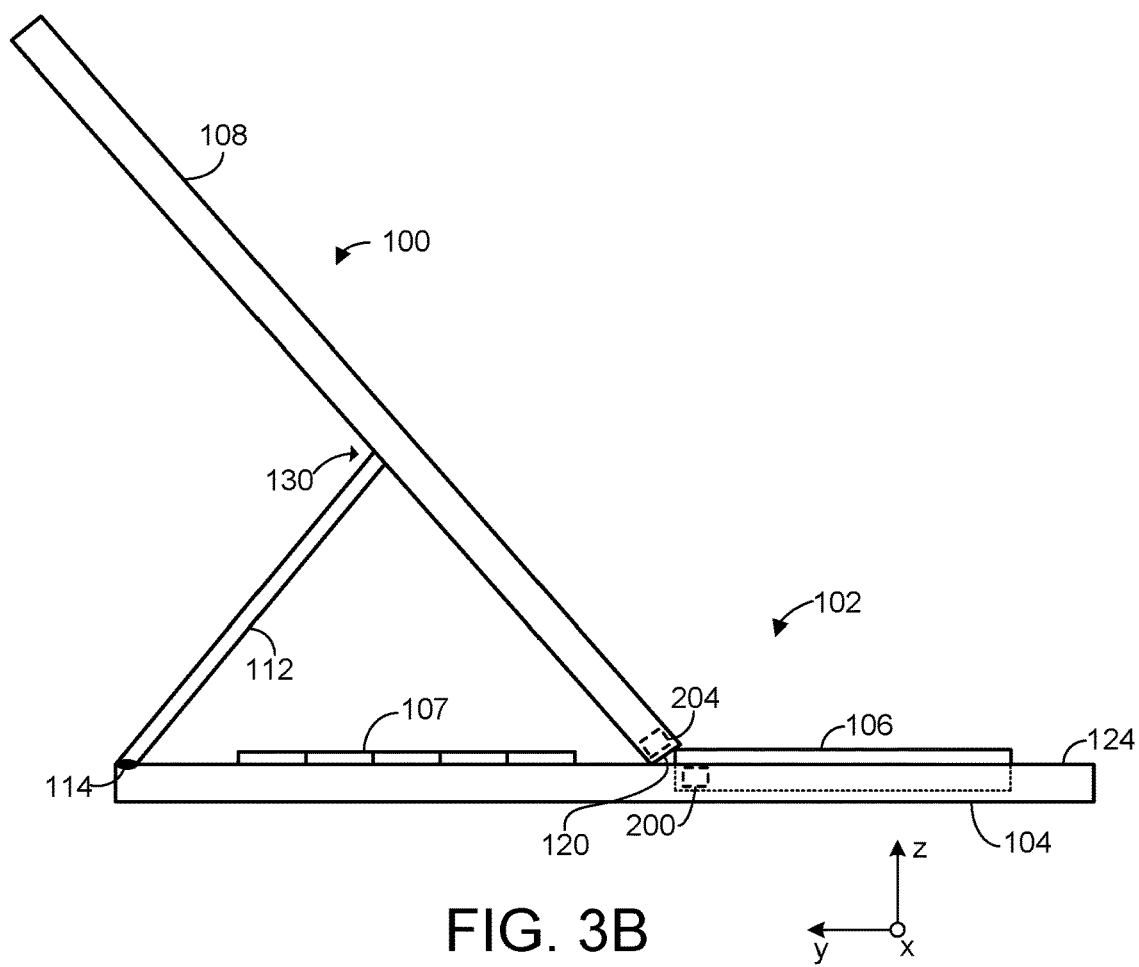

As shown in FIGS. 1B and 3B, collapsible support member 112 is rotatably connected to the base portion 104 at a hinge 114. As indicated above and shown in FIGS. 3A and 3B, the bottom edge 120 of display portion 108 is not rigidly affixed to the upper surface 124 of base portion 104. Rather, as will be described in more detail below, the bottom edge 120 of display portion 108 is moveable to any of a range of securable display positions along the base portion 104.

In some examples, the collapsible support member 112 is moveably coupled to the display portion 108 via a living hinge 130. In other examples, the collapsible support member 112 may be moveably coupled to the display portion 108 via a mechanical hinge or any other suitable coupling that enables the display portion to pivot about the support member. In some examples, the collapsible support member 112 may serve as a conduit for data and/or power exchange between the base and display portions.

Figure 4A:
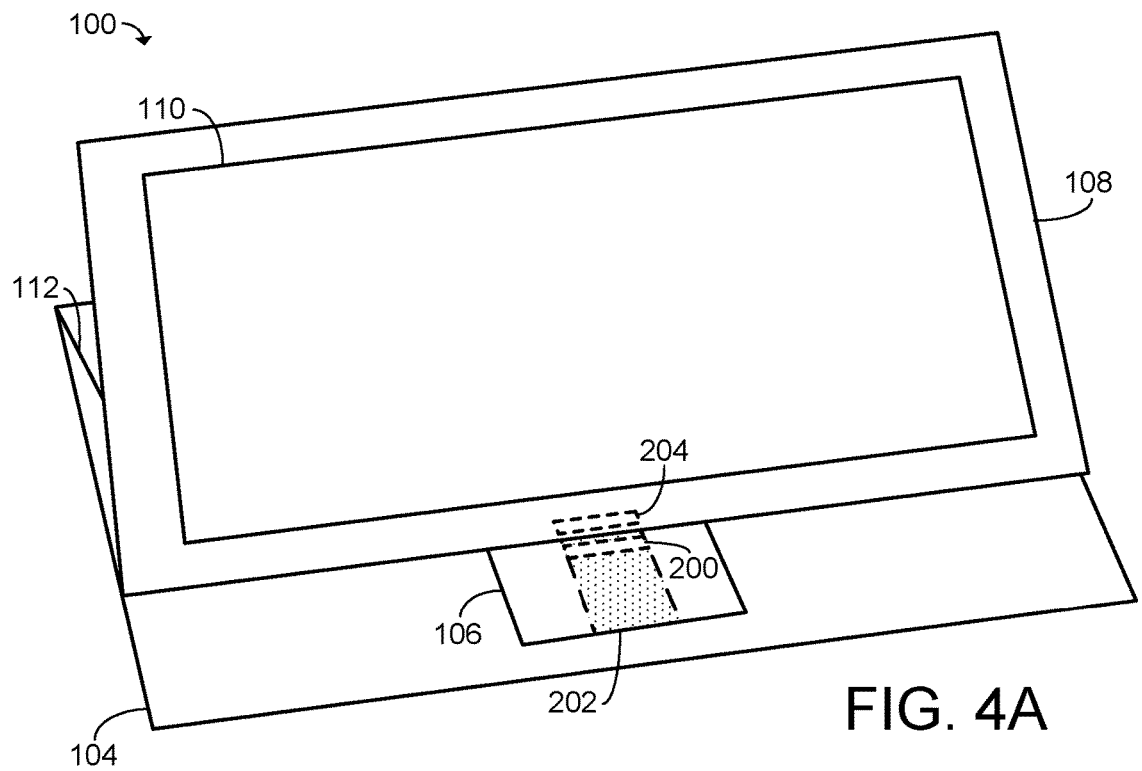
FIGS. 4A and 4B schematically depict the example display positioning assembly of FIGS. 1A and 1B in which the display is positioned at a first securable position according to examples of the present disclosure.
Figure 4B:
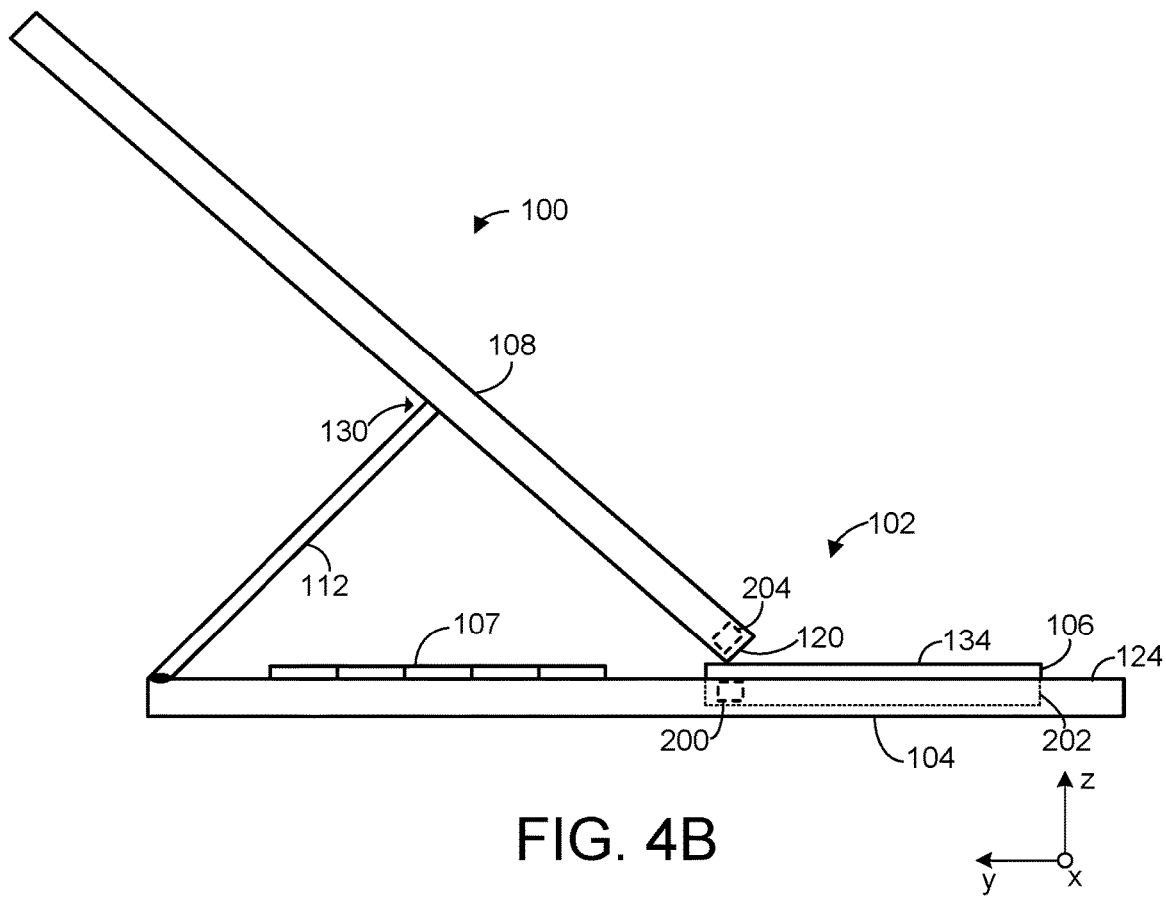
Figure 5:
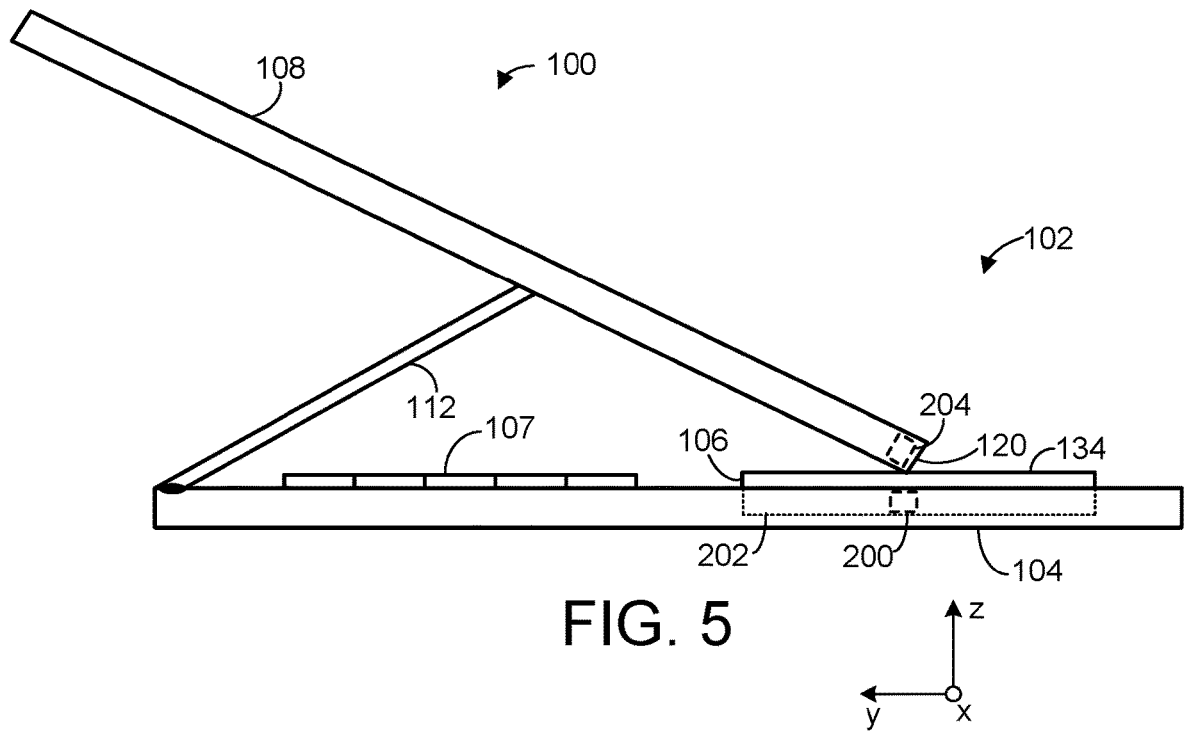
FIG. 5 schematically depicts the example display positioning assembly of FIGS. 1A and 1B in which the display is positioned at a second securable position according to examples of the present disclosure.
Figure 6:
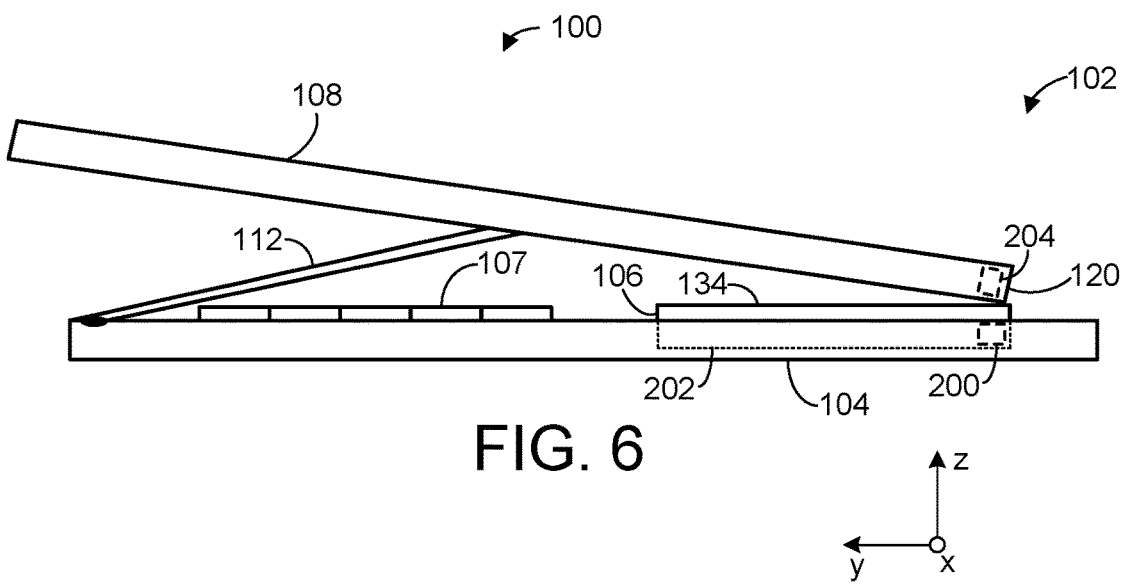
FIG. 6 schematically depicts the example display positioning assembly of FIGS. 1A and 1B in which the display is positioned at another securable position according to examples of the present disclosure.

As shown in FIGS. 4B, 5 and 6 and described in more detail below, the bottom edge 120 of display portion 108 may be moved and securely held in a range of securable display positions via cooperating ferromagnetic components in the base portion 104 and display portion 108. More particularly and with reference to FIG. 2A and the partial cross-section shown in FIG. 2B, in this example display positioning assembly 102 includes a base ferromagnetic component 200 that is moveably retained within an elongated pocket 202 of the base portion 104. In this example, the elongated pocket 202 is disposed beneath trackpad 106, such that base ferromagnetic component 200 is moveable in a y-axis direction relative to the base portion 104. In some examples, a suitable low friction material, lining, or coating may be used within the elongated pocket to facilitate movement of the ferromagnetic component within the pocket—e.g., a copolymer layer or a lubricant.

In other implementations, the elongated pocket 202 may have other configurations and/or locations within the base portion 104. For example, the elongated pocket 202 may extend beyond an edge of the trackpad 106, such that only a portion of the elongated pocket is disposed beneath the trackpad. In other examples, the computing device 100 may omit a trackpad, in which case the elongated pocket may be disposed beneath a different component of the base portion, or generally located within the chassis of the base portion without being beneath any particular feature.

Figure 2A:
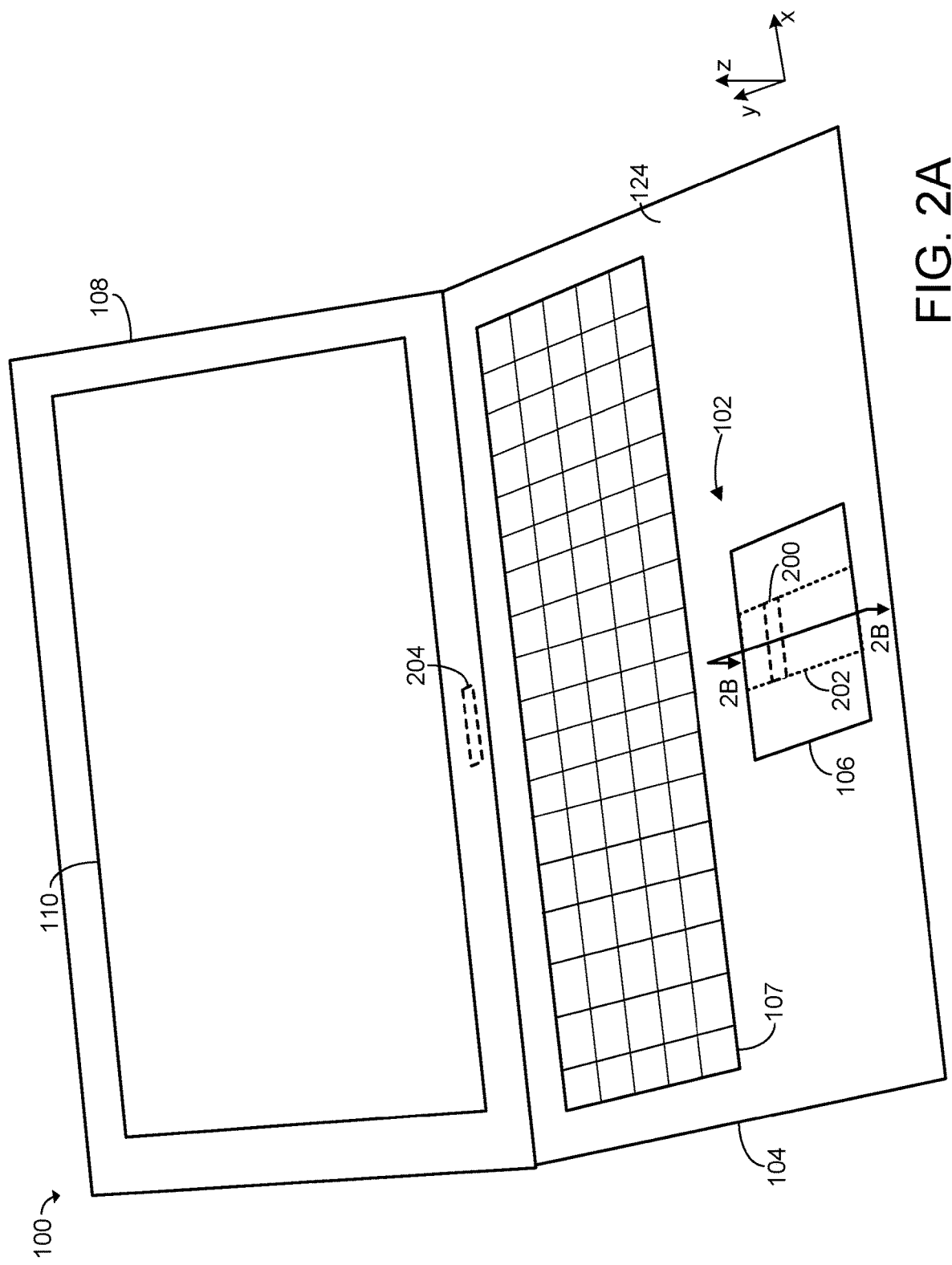
FIG. 2A schematically depicts details of the example display positioning assembly of FIGS. 1A and 1B according to examples of the present disclosure.
Figure 2B:
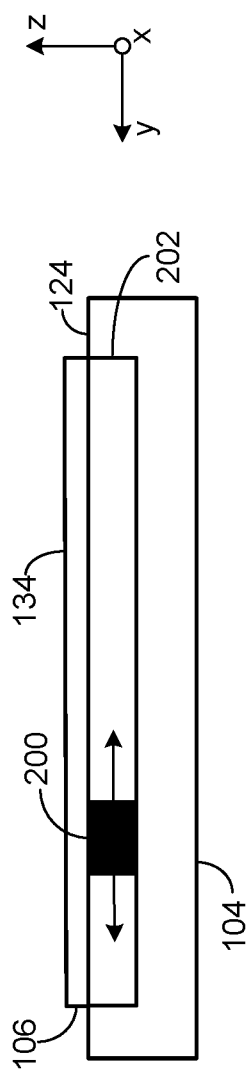
FIG. 2B schematically depicts a partial cross section taken along line 2B in FIG. 2A according to examples of the present disclosure.

In FIG. 2A, the base ferromagnetic component 200 and elongated pocket 202 are shown in dashed lines to indicate that they are located beneath the trackpad 106. FIG. 2A also shows a display ferromagnetic component 204 that is fixedly retained within display portion 108 of the computing device 100. As with base ferromagnetic component 200 and elongated channel 202, display ferromagnetic component 204 is shown in dashed lines to indicate that the display ferromagnetic component is retained within a chassis of the display portion 108 and would not ordinarily be visible from the illustrated perspective. As described in more detail below, one or both of the base ferromagnetic component and display ferromagnetic component may be a magnet disposed such that magnetic attraction between the ferromagnetic components enables the display portion 108 to be easily and conveniently secured in a variety of display positions on the upper surface 124 of base portion 104. In cases where the base and display ferromagnetic components are magnets, the base and display magnets may be oriented such that they each emit magnetic fields having opposite polarities beyond the chassis of the computing device. Each of the base ferromagnetic component 200 and display ferromagnetic component 204 may have any suitable size and shape, and the base and display ferromagnetic components need not each have the same size and shape. Furthermore, the base and display ferromagnetic components may each be composed of any suitable material—e.g., the base and display ferromagnetic components may be any ferromagnetic materials. In cases where any or all of the ferromagnetic components are magnets, such magnets may be alnico magnets, rare earth magnets, neodymium magnets, ceramic magnets, etc.

As noted above, FIG. 2B schematically depicts a partial cross section of base portion 104 taken through the trackpad 106 and elongated pocket 202. In this example, trackpad 106 is slightly raised above the upper surface 124 of base portion 104, and the elongated pocket 202 is disposed below the trackpad. In some examples, to facilitate the smooth sliding of the bottom edge 120 of the display portion 108 along the trackpad 106, an upper surface 134 of the trackpad 106 comprises a low-friction material. As one example, the upper surface 134 of the trackpad 106 may be coated in or constructed from a copolymer such as nylon. In general, however, any suitable material may be used on the upper surface 134 of the trackpad, as well as the upper surface of the base portion. As examples, such materials may include metals, plastics, glass/ceramics, natural/synthetic fabrics, copolymers, elastomers, etc.

As discussed above, base ferromagnetic component 200 is moveably retained within the elongated pocket 202. Accordingly, and in response to the movement of a magnetically attractive force (e.g., due to proximity of the display ferromagnetic component 204), the base ferromagnetic component may move within the elongated pocket. As described in more detail below and shown in FIGS. 4B, 5 and 6, this allows the display portion 108 to be moved to and secured at various positions on the trackpad 106.

Figure 2C:
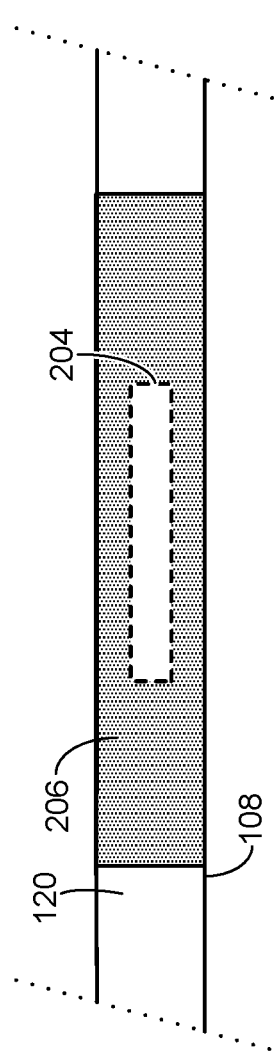
FIG. 2C schematically depicts a portion of the bottom edge of a display portion of the computing device of FIG. 1A according to examples of the present disclosure.

FIG. 2C schematically shows an end view of a portion of the bottom edge 120 of display portion 108. Display ferromagnetic component 204 is shown in dashed lines to indicate the position of the display ferromagnetic component as slightly recessed within and spaced from the bottom edge 120 of the display portion 108. In this example, an elastomeric layer 206 is affixed to a portion of the bottom edge 120 of display portion 108. The elastomeric layer is composed of a relatively higher-friction material that facilitates holding the display portion 108 in a particular secured position on the upper surface of the base portion 104, while also allowing the user to reposition the display portion by sliding the bottom edge along the upper surface 124 of the base portion. Any suitable elastomeric material may be used, such as a natural or synthetic rubber. In different implementations, an elastomeric layer may cover all or a portion of the bottom edge 120 of the display portion 108 or may be omitted entirely. Additionally, or alternatively, the bottom edge of the display portion may be constructed from or coated with any other suitable materials. Such materials may include suitable metals, plastics, glass/ceramics, natural/synthetic fabrics, copolymers, elastomers, etc.

FIGS. 3A and 3B show an orientation of the computing device 100 in which the bottom edge 120 of the display portion 108 has been moved from behind the keyboard and is abutting the top end of the trackpad 106. To enable this change in orientation of the display portion, collapsible support member 112 pivots about hinge 114 and display portion 108 pivots about living hinge 130. In this orientation, display portion 108 is held in place by the top end of trackpad 106, which prevents the bottom edge 120 from sliding along the top surface 124 in the negative y-axis direction. In some use cases this "studio" display position may be useful for viewing and interacting with content on the display (e.g., a video) while still providing access to the trackpad 106.

Turning now to FIGS. 4A and 4B, the position of the display portion 108 has been changed to slightly increase the viewing angle relative to the top surface 124 of the base portion 104. More particularly, the display portion 108 is now secured to a first securable display position on top of trackpad 106. In this position, magnetic attraction between display ferromagnetic component 204 and base ferromagnetic component 200 secures the bottom edge 120 of display portion 108 against the upper surface 134 of trackpad 106. For example, from the "studio" display position shown in FIG. 3B, a user may simply lift the display portion 108, move it slightly forward and lower it towards the trackpad 106. The magnetic attraction between display ferromagnetic component 204 and base ferromagnetic component 200 will pull the bottom edge 120 downwardly and secure it against the trackpad 106 to hold the display portion 108 in this orientation. In some examples, the base ferromagnetic component 200 may move via magnetic attraction in the y-axis direction within pocket 202 to a location underneath the display ferromagnetic component 204 as the bottom edge 120 is lowered to the trackpad 106.

Turning now to FIG. 5, the display portion 108 has been further rotated relative to base portion 104, such that the bottom edge 120 of display portion is now secured at a second securable display position above the approximate center of trackpad 106. To secure the display portion 108 in this new orientation, base ferromagnetic component 200 translates via magnetic attraction of the display ferromagnetic component 204 in the negative y-axis direction within pocket 202 to a position underneath the display ferromagnetic component. In some examples, a user may easily and conveniently adjust the orientation of display portion 108 from the first securable display position of FIG. 4B to the second securable display position of FIG. 5 by simply sliding the bottom edge 120 of the display portion along the upper surface 134 of trackpad 106. As the bottom edge 120 slides, the magnetic field of the moving display ferromagnetic component 204 causes the base ferromagnetic component 200 to correspondingly move within pocket 202, while also holding the bottom edge against the upper surface 134 of the trackpad 106.

Turning now to FIG. 6, the display portion 108 has been further rotated relative to base portion 104, such that the bottom edge 120 of the display portion is now secured at a third securable display position above the rear edge of trackpad 106. Once again, magnetic attraction between the base ferromagnetic component 200 and display ferromagnetic component 204 secures the display portion 108 in this more angled display position. As noted above, the user may easily adjust the orientation of display portion 108 from the second position of FIG. 5 to the third position of FIG. 6 by simply sliding the bottom edge 120 of the display portion along the upper surface 134 of trackpad 106. The base ferromagnetic component 200 moves within pocket 202 to follow the display ferromagnetic component 204, thereby enabling the user to conveniently position the display portion 108 at any desired angle along the trackpad 106.

In some implementations, the display portion 108 may be further rotated relative to the position shown in FIG. 6, such that the display portion 108 lays flat along the base portion 104, and collapsible support member 112 is sandwiched between keyboard 107 and display portion 108. In this orientation akin to a tablet mode, the display screen 110 faces upwardly in the z-axis direction.

In the example of FIGS. 2-6, display positioning assembly 102 includes a single base ferromagnetic component retained within a single elongated pocket and is paired with a single corresponding display ferromagnetic component. In other implementations, a display positioning assembly of the present disclosure may include any number of base ferromagnetic components and display ferromagnetic components. For example, FIG. 7 schematically depicts another example of a computing device 700 that utilizes a different display positioning assembly 702.

Like the display positioning assembly 102 discussed above, display positioning assembly 702 includes a base portion 704, trackpad 706, a base ferromagnetic component 708A disposed within an elongated pocket 710A, and a corresponding display ferromagnetic component 712A. However, display positioning assembly 702 further comprises a second display ferromagnetic component 712B in display portion 714, and second base ferromagnetic component 708B moveably retained in a second elongated pocket 710B positioned laterally to the first base ferromagnetic component 708A within base portion 704. In this example, both pairs of ferromagnetic components cooperate in the manner described above to enable the display portion 714 to be positioned at any desired angle along the trackpad 706.

In other examples, three or more pairs of base and display ferromagnetic components and corresponding pockets may be utilized. In some examples, two or more base ferromagnetic components may be retained in the same elongated pocket. In general, a display positioning assembly may include any number of base and display ferromagnetic components and need not have the same number of display ferromagnetic components as base ferromagnetic components. For example, an alternate display positioning assembly may include two base ferromagnetic components moveably retained within the base portion, and a single display ferromagnetic component in the display portion having sufficient length to magnetically attract both base ferromagnetic components.

FIG. 8 illustrates an example method 800 for positioning a display portion of a computing device. Method 800 may be implemented via any suitable display positioning assembly as described above, including assemblies 102 and 702.

At 802 method 800 includes positioning a bottom edge of the display portion of a computing device at a securable display position on an upper surface of a base portion of the computing device, wherein the display portion comprises a display ferromagnetic component, the base portion comprises a base ferromagnetic component, and one or both of the display ferromagnetic component and base ferromagnetic component is a magnet, such that the bottom edge of the display portion is secured at the securable display position via magnetic attraction between the base ferromagnetic component and the display ferromagnetic component. This is illustrated, for example, in FIGS. 4A and 4B where display positioning assembly 102 secures the bottom edge 120 of display portion 108 to a first securable display position on top of trackpad 106.

Returning to FIG. 8, at 804 method 800 includes sliding the bottom edge of the display portion along the upper surface of the base portion from the first securable display position to a second securable display position, wherein movement of the display portion from the first securable display position to the second securable display position causes corresponding movement of the base ferromagnetic component within the base portion via magnetic attraction between the base ferromagnetic component and the display ferromagnetic component. This is illustrated at least with respect to FIGS. 4B and 5, in which movement of the display portion 108 from the first securable display position to the second securable display position causes sliding of the bottom edge 120 of the display portion along the trackpad 106. As described above, such movement causes corresponding movement of base ferromagnetic component 200 within elongated pocket 202.

Figure 9:
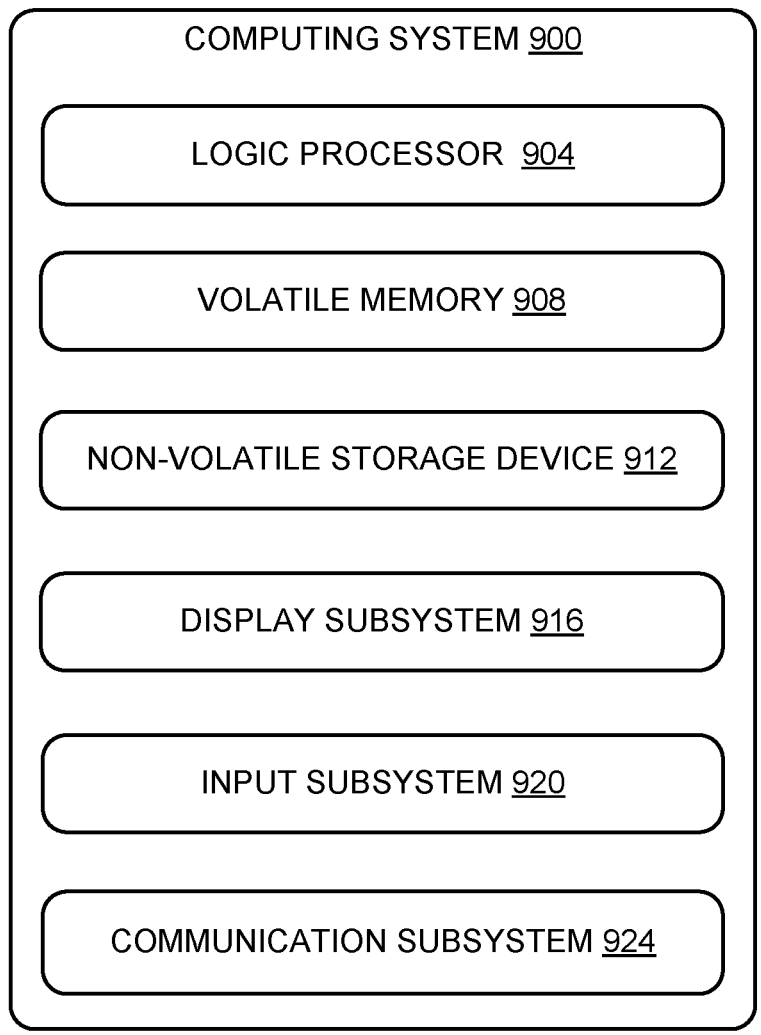
FIG. 9 is a block diagram of an example computing system according to examples of the present disclosure.

FIG. 9 schematically shows a non-limiting embodiment of a computing system 900 shown in simplified form. Computing system 900 may take the form of one or more personal computers, laptop computers, desktop computers, all-in-one displays, tablet computers, home-entertainment computers, gaming devices or consoles, mobile computing devices, mobile communication devices (e.g., smart phones), and/or other computing devices. In the above examples, computing devices 100 and 700 may comprise computing system 900 or one or more aspects of computing system 900.

Computing system 900 includes a logic processor 904, volatile memory 908, and a non-volatile storage device 912. Computing system 900 may optionally include a display subsystem 916, input subsystem 920, communication subsystem 924, and/or other components not shown in FIG. 9.

Logic processor 904 includes one or more physical devices configured to execute instructions. For example, the logic processor may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic processor 904 may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 904 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 912 includes one or more physical devices configured to hold instructions executable by the logic processors to implement the methods and processes described herein. When such methods and processes are implemented, the state of non-volatile storage device 912 may be transformed—e.g., to hold different data.

Non-volatile storage device 912 may include physical devices that are removable and/or built-in. Non-volatile storage device 912 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 912 may include nonvolatile, dynamic, static, read/write, read-only, sequential-access, location-addressable, file-addressable, and/or content-addressable devices. It will be appreciated that non-volatile storage device 912 is configured to hold instructions even when power is cut to the non-volatile storage device 912.

Volatile memory 908 may include physical devices that include random access memory. Volatile memory 908 is typically utilized by logic processor 904 to temporarily store information during processing of software instructions. It will be appreciated that volatile memory 908 typically does not continue to store instructions when power is cut to the volatile memory 908.

Aspects of logic processor 904, volatile memory 908, and non-volatile storage device 912 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

When included, display subsystem 916 may be used to present a visual representation of data held by non-volatile storage device 912. As the herein described methods and processes change the data held by the non-volatile storage device, and thus transform the state of the non-volatile storage device, the state of display subsystem 916 may likewise be transformed to visually represent changes in the underlying data. Display subsystem 916 may include one or more display devices utilizing virtually any type of technology. Such display devices may be combined with logic processor 904, volatile memory 908, and/or non-volatile storage device 912 in a shared enclosure, or such display devices may be peripheral display devices.

When included, input subsystem 920 may comprise or interface with one or more user-input devices such as a touchpad, keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 924 may be configured to communicatively couple various computing devices described herein with each other, and with other devices. Communication subsystem 924 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 900 to send and/or receive messages to and/or from other devices via a network such as the Internet.

In an example, a display positioning assembly comprises: a base portion comprising a base ferromagnetic component moveably retained within the base portion; and a display portion comprising a display ferromagnetic component, wherein the display portion is moveably coupled to the base portion, and wherein one or both of the base ferromagnetic component and display ferromagnetic component is a magnet. In this example or any other example, the base portion comprises an elongated pocket, and the base ferromagnetic component is moveably retained within the elongated pocket. In this example or any other example, the base portion further includes a trackpad, and at least a portion of the elongated pocket is disposed beneath the trackpad. In this example or any other example, the trackpad includes a copolymer upper surface. In this example or any other example, movement of the display portion from a first securable display position to a second securable display position causes corresponding movement of the base ferromagnetic component within the base portion via magnetic attraction between the base ferromagnetic component and the display ferromagnetic component. In this example or any other example, the display portion is moveably coupled to the base portion via a collapsible support member. In this example or any other example, the base ferromagnetic component is a first base ferromagnetic component, and the base portion further comprises a second base ferromagnetic component moveably retained within the base portion and positioned laterally to the first base ferromagnetic component. In this example or any other example, each of the first base ferromagnetic component and the second base ferromagnetic component are moveably retained in separate elongated pockets of the base portion. In this example or any other example, the display portion includes a bottom edge, and an elastomeric layer is affixed to at least a portion of the bottom edge. In this example or any other example, the display ferromagnetic component is a first display ferromagnetic component, and the display portion further comprises one or more additional display ferromagnetic components.

In an example, a computing device comprises: a base portion comprising an input device and a base ferromagnetic component moveably retained within the base portion; and a display portion comprising a display screen and a display ferromagnetic component retained within the display portion, the display portion moveably coupled to the base portion, wherein one or both of the base ferromagnetic component and display ferromagnetic component is a magnet. In this example or any other example, the base portion comprises an elongated pocket, and the base ferromagnetic component is moveably retained within the elongated pocket. In this example or any other example, the input device is a trackpad, and at least a portion of the elongated pocket is disposed beneath the trackpad. In this example or any other example, the trackpad comprises a copolymer upper surface. In this example or any other example, movement of the display portion from a first securable display position to a second securable display position causes corresponding movement of the base ferromagnetic component within the base portion via magnetic attraction between the base ferromagnetic component and the display ferromagnetic component. In this example or any other example, the display portion is moveably coupled to the base portion via a collapsible support member. In this example or any other example, the base ferromagnetic component is a first base ferromagnetic component, and the base portion further comprises a second base ferromagnetic component moveably retained within the base portion and positioned laterally to the first base ferromagnetic component. In this example or any other example, each of the first base ferromagnetic component and the second base ferromagnetic component are moveably retained in separate elongated pockets of the base portion. In this example or any other example, the display ferromagnetic component is a first display ferromagnetic component, and the display portion further includes one or more additional display ferromagnetic components.

In an example, a method of positioning a display portion of a computing device comprises: positioning a bottom edge of the display portion at a securable display position on an upper surface of a base portion of the computing device, the display portion comprising a display ferromagnetic component, the base portion comprising a base ferromagnetic component, the bottom edge of the display portion being secured at the securable display position via magnetic attraction between the base ferromagnetic component and the display ferromagnetic component, wherein one or both of the base ferromagnetic component and display ferromagnetic component is a magnet; and sliding the bottom edge of the display portion along the upper surface of the base portion from the first securable display position to a second securable display position, wherein movement of the display portion from the first securable display position to the second securable display position causes corresponding movement of the base ferromagnetic component within the base portion via magnetic attraction between the base ferromagnetic component and the display ferromagnetic component.

It will be understood that the configurations and/or approaches described herein are exemplary in nature, and that these specific embodiments or examples are not to be considered in a limiting sense, because numerous variations are possible. The subject matter of the present disclosure includes all novel and non-obvious combinations and sub-combinations of the various processes, systems and configurations, and other features, functions, acts, and/or properties disclosed herein, as well as any and all equivalents thereof.

The claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure. As used herein, the phrase "and/or" means any or all of multiple stated possibilities.

The invention claimed is:

1. A display positioning assembly, comprising:
 a base portion comprising a base ferromagnetic component moveably retained within an elongated pocket of the base portion; and
 a display portion comprising a display ferromagnetic component, wherein the display portion is moveably coupled to the base portion such that movement of a bottom edge of the display portion from a first securable display position on the base portion to a second securable display position on the base portion causes corresponding movement of the base ferromagnetic component within the elongated pocket from below the first securable display position to below the second securable display position, and wherein one or both of the base ferromagnetic component and display ferromagnetic component is a magnet.

2. The display positioning assembly of claim 1, wherein the base portion further includes a trackpad, and at least a portion of the elongated pocket is disposed beneath the trackpad.

3. The display positioning assembly of claim 2, wherein the trackpad includes a copolymer upper surface.

4. The display positioning system of claim 1, wherein the movement of the base ferromagnetic component within the base portion is caused by magnetic attraction between the base ferromagnetic component and the display ferromagnetic component.

5. The display positioning assembly of claim 1, wherein the display portion is moveably coupled to the base portion via a collapsible support member.

6. The display positioning assembly of claim 1, wherein the base ferromagnetic component is a first base ferromagnetic component, and the base portion further comprises a second base ferromagnetic component moveably retained within the base portion and positioned laterally to the first base ferromagnetic component.

7. The display positioning assembly of claim 6, wherein each of the first base ferromagnetic component and the second base ferromagnetic component are moveably retained in separate elongated pockets of the base portion.

8. The display positioning assembly of claim 1, wherein an elastomeric layer is affixed to at least a portion of the bottom edge of the display portion.

9. The display positioning assembly of claim 1, wherein the display ferromagnetic component is a first display ferromagnetic component, and the display portion further comprises one or more additional display ferromagnetic components.

10. A computing device, comprising:
 a base portion comprising an input device and a base ferromagnetic component moveably retained within an elongated pocket of the base portion; and
 a display portion comprising a display screen and a display ferromagnetic component retained within the display portion, the display portion moveably coupled to the base portion such that movement of a bottom edge of the display portion from a first securable display position on the base portion to a second securable display position on the base portion causes corresponding movement of the base ferromagnetic component within the elongated pocket from below the first securable display position to below the second securable display position, wherein one or both of the base ferromagnetic component and display ferromagnetic component is a magnet.

11. The computing device of claim 10, wherein the input device is a trackpad, and at least a portion of the elongated pocket is disposed beneath the trackpad.

12. The computing device of claim 11, wherein the trackpad comprises a copolymer upper surface.

13. The computing device of claim 10, wherein the movement of the base ferromagnetic component within the base portion is caused by magnetic attraction between the base ferromagnetic component and the display ferromagnetic component.

14. The computing device of claim 10, wherein the display portion is moveably coupled to the base portion via a collapsible support member.

15. The computing device of claim 10, wherein the base ferromagnetic component is a first base ferromagnetic component, and the base portion further comprises a second base ferromagnetic component moveably retained within the base portion and positioned laterally to the first base ferromagnetic component.

16. The computing device of claim 15, wherein each of the first base ferromagnetic component and the second base ferromagnetic component are moveably retained in separate elongated pockets of the base portion.

17. The computing device of claim 10, wherein the display ferromagnetic component is a first display ferromagnetic component, and the display portion further includes one or more additional display ferromagnetic components.

18. A method of positioning a display portion of a computing device, the method comprising:
 positioning a bottom edge of the display portion at a first securable display position on an upper surface of a base portion of the computing device, the display portion comprising a display ferromagnetic component, the base portion comprising a base ferromagnetic component moveably retained within an elongated pocket of the base portion, the bottom edge of the display portion being secured at the first securable display position via magnetic attraction between the base ferromagnetic component and the display ferromagnetic component, wherein one or both of the base ferromagnetic component and display ferromagnetic component is a magnet; and
 sliding the bottom edge of the display portion along the upper surface of the base portion from the first securable display position to a second securable display position, wherein movement of the display portion from the first securable display position to the second securable display position causes corresponding movement of the base ferromagnetic component within the elongated pocket of the base portion from below the first securable display position to below the second securable display position via magnetic attraction between the base ferromagnetic component and the display ferromagnetic component.

19. The display positioning assembly of claim 1, wherein the elongated pocket extends in a direction parallel to an upper surface of the base portion.

20. The display positioning assembly of claim 1, wherein the elongated pocket comprises a first end and an opposing second end, the first end located between the second end and a first edge of the base portion, and the second end located between the first end and a second edge of the base portion that is opposite to the first edge of the base portion.

* * * * *